Patented Aug. 25, 1936

2,052,165

UNITED STATES PATENT OFFICE 2,052,165

SEPARATION OF SAPONIFIABLE FROM UNSAPONIFIABLE COMPOUNDS

Egbert W. Carrier and Edward Duer Reeves, Baton Rouge, La., assignors to Standard Oil Development Company, a corporation of Delaware No Drawing. Application December 22, 1932, Serial No. 648,440

2 Claims. (Cl. 260—122)

This invention relates to the separation of saponifiable from unsaponifiable organic compounds and more particularly to the separation of organic acids from mixtures with water-insoluble organic compounds, such as the separation of acids from the product of limited oxidation of hydrocarbons.

In the production of fatty acids by limited oxidation of paraffin wax, petroleum and similar heavy hydrocarbon oils and waxes, the oxidation product is usually obtained as a mixture containing saponifiable material, such as fatty acids including unsaturated fatty acids, substituted fatty acids, esters and lactones, together with unsaponifiable material, such as unoxidized or insufficiently oxidized wax, lighter hydrocarbons, alcohols, aldehydes, ketones and the like. The saponifiable material may be separated from such products by treatment with aqueous caustic soda under suitable saponifying conditions, for example, the saponification may be conducted in an autoclave at a temperature of 140 to 160° C. The resulting aqueous solution of the water-soluble soaps is then separated from the water-insoluble constituents by extraction. Free fatty acids may be obtained by treating such soaps with sulphuric or other strong mineral acids. Objections to this process are that the use of strong caustic soda in the saponification is likely to impair the color and other qualities of the products and the recovery of the free fatty acids requires the use of strong mineral acids with consequent loss of all the caustic soda and mineral acid used, as sodium salts of low value.

Marked improvements in the separation of the saponifiable constituents and the production of free fatty acids may be obtained if the saponification is conducted with ammonia in the presence of water. Following the saponification, which may or may not be entirely complete, the resulting ammonium soaps are soluble in water and may be readily separated from the unsaponified matter by extraction with suitable solvents. The ammonium soaps may be decomposed by ordinary steam distillation and the ammonia may be recovered as distillate and returned to the saponification step, while the free fatty acids are obtained as a distillation residue.

The following example is presented in illustration and not in limitation of this invention and illustrates one method in which the improved process may be conducted.

One hundred pounds of a paraffin oxidation product obtained by limited oxidation of paraffin wax in liquid phase with air at a temperature of about 140 to 170° C. is mixed with 4 pounds of 28% aqueous ammonia and with 161 pounds of a steam-still distillate to be discussed later. This distillate contains 2.8 pounds of ammonia, 32.3 pounds of iso-propyl alcohol and 125.9 pounds of water. This mixture is then subjected to a temperature of 140 to 150° C. at a pressure of about 80 pounds per square inch for 2 hours until the saponification is substantially complete. Following the saponification the mixture is cooled and is extracted by contact in a packed tower with a countercurrent stream of 340 pounds of gasoline. The resulting gasoline extract consists of 50 pounds of unsaponifiable matter and the aqueous alcohol solution contains 53.7 pounds of ammonium soaps and 0.2 pound of free ammonia. This solution is then distilled with 30 pounds of steam at atmospheric pressure and there is obtained as distillate 2.8 pounds of ammonia, 32.3 pounds of alcohol and 30 pounds of water. 95.9 pounds of water are used to complete the condensation of the distilled ammonia and alcohol by direct contact. The total distillate with the added water is then recycled to the above described saponification step. The residue from the steam distillation contains 35 pounds of free fatty acids, 14.9 pounds of nitrogenous compounds, such as acid amides, and 130 pounds of water. This is acidified with 7.1 pounds of 50% strength aqueous sulphuric acid at 90° C. On standing the fatty acids separate as an upper layer and are separately withdrawn, leaving a dilute aqueous solution of ammonium sulphate with a slight amount of free sulphuric acid. This solution may be discarded or the ammonium salts and acid may be recovered by suitable means, if desired. Fifty pounds of crude fatty acids containing less than 5% of unsaponifiable matter are thus obtained.

The saponification step of the above example is preferably conducted with a slight excess of ammonia above that required for complete saponification. While a 5% excess of ammonia is suitable, a 20% excess or even a larger excess may be used if desired. The saponification may be conducted at any suitable temperature and pressure, for example, temperatures of about 80 to 160° C. may be used at pressures from atmospheric to 120 pounds per square inch, or even higher. The amount of ammonia used in the saponification step with products of the type described above is preferably maintained between about 1 and 3% by weight of the total constituents present.

The presence of alcohol is unnecessary in the saponification step, although recycled alcohol is conveniently added at this point with the recycled ammonia. The lighter water-soluble aliphatic alcohols, such as ethyl and iso-propyl, are advantageous in preventing the formation of emulsions during the extraction of the unsaponified material with gasoline. Other light hydrocarbon solvents, such as benzol, heavy naphtha, and liquefied hydrocarbon gases may be used instead of gasoline for this extraction, or the extraction may be conducted under pressure and the solvents charged with the lighter normally gaseous hydrocarbons, such as propane and butane.

The residue from the decomposition of the ammonium soaps by steam distillation or otherwise is preferably treated with mineral acid, such as sulphuric, at a sufficiently high temperature to hydrolyze the acid amides.

The crude fatty acids separated after this acidification step may then be washed with water and distilled preferably under high vacuum with direct steam to obtain purified fatty acids. The residues from this vacuum distillation contain acids having 20 or more atoms of carbon per molecule. These residues may then be cracked to obtain oxygenated compounds of lower molecular weight which may be added to the wax oxidation product and subjected to the saponification and separation step above described.

This invention is not to be limited to any examples which are submitted herewith solely for the purpose of illustration, nor to any theory of this process as to the composition of the products, but only by the following claims in which we wish to claim all novelty inherent so far as the prior art permits.

We claim:

1. Method for treating products of oxidation of paraffin wax containing fatty acids and unsaponifiable intermediate oxidation products comprising saponifying said product with an excess of ammonia at an elevated temperature and pressure in the presence of aqueous alcohol, extracting the unsaponified matter from the resulting mixture with a petroleum naphtha in the presence of aqueous alcohol, distilling with steam the remaining aqueous alcohol solution of ammonium soaps until the distillate contains an inappreciable amount of ammonia, acidifying the distillation residue with a strong mineral acid whereby ammonium salts are obtained in an aqueous solution, and separately withdrawing a product comprising crude fatty acids.

2. Method according to claim 1 in which the saponification step is conducted at about 150° C. and about 80 pounds per square inch pressure.

EGBERT W. CARRIER.
EDWARD DUER REEVES.